Patented Dec. 28, 1937

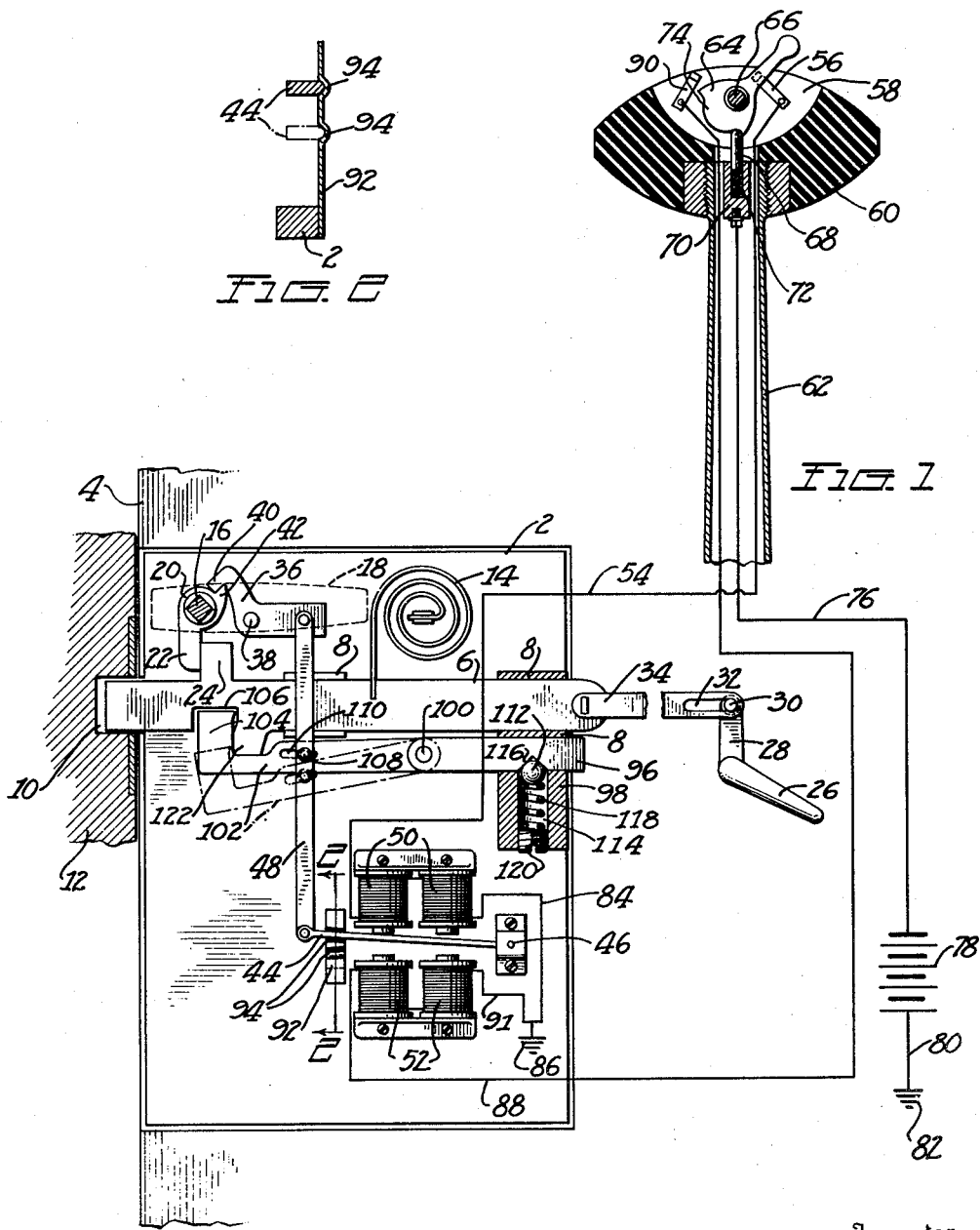

2,103,702

UNITED STATES PATENT OFFICE 2,103,702

MOTOR VEHICLE LATCH

Milton Tibbetts, Detroit, Mich., assignor to Packard Motor Car Company, Detroit, Mich., a corporation of Michigan Application July 30, 1934, Serial No. 737,506

12 Claims. (Cl. 292—164)

This invention relates to motor vehicles and more particularly to locking mechanism for locking the doors of such vehicles.

The doors of motor vehicles are usually provided with locking mechanisms respectively for locking the doors individually from the inside. One of the doors is ordinarily provided with mechanism for locking said door from the outside. Locking mechanisms have been devised for motor vehicles in which all of the doors may be locked simultaneously from the inside by the actuation of a single locking device and in which all of said doors may also be locked simultaneously from the outside by the actuation of a single locking device. In certain of these constructions, the doors when locked from the inside cannot be opened from the outside but may be opened individually from the inside.

Any system in which the doors, after being locked from the inside can readily be opened from the inside has certain marked disadvantages. It is common practice when a door is partially closed with the latch bolt in engagement with the outer projection on the striker plate, to close the door by opening the door and slamming it. Also persons within a motor vehicle sometimes open one of the doors for the purpose of alighting while the vehicle is in motion. These practices are liable to result in damage to the vehicle and may cause severe injury to the person who opens the door. An open or partially open door may strike an obstruction and be torn from its hinges. A person alighting from a moving motor vehicle is particularly subject to injury as is well known to those familiar with the operation of such vehicles.

A careless person sometimes will open the door of a motor vehicle when the vehicle is moving at high speed. This is particularly hazardous. When the door is open, the wind may catch the door and pull it away from the person who opens the same. Oftentimes the door is swung back with such force that it is pulled completely off its hinges. Cases have occurred in which a person has opened a door of a vehicle when the vehicle was running at high speed and has been pulled from the vehicle by the swift outward movement of the door produced by the force of the air on the inner surface thereof.

When a vehicle is left in locked condition and one or more of the doors has been locked by mechanism which prevents opening from the outside but enables them to be unlocked and opened from the inside, a thief may pry open or break a piece out of a window and then reach in with some instrument and unlock said door or doors.

Certain systems have been devised in which the doors of a motor vehicle may all be locked from the inside by the action of a single manually operable device and in which the doors cannot be unlocked from the inside except by the operation of said device. Many persons seriously object to being locked in a moving vehicle so that they cannot open any of the doors of the vehicle.

One object of the present invention is to improve the construction and mode of operation of locking mechanisms for locking the doors of motor vehicles and to produce a locking mechanism which will avoid the disadvantages above pointed out in prior locking mechanisms.

Another object of the invention is to provide locking mechanisms for locking the doors of motor vehicles in which the doors, while locked from the inside, cannot be readily opened from the inside but may be opened from the inside in an emergency.

Another object of the invention is to provide motor vehicles with a novel and improved mechanism for simultaneously locking two or more of the doors from the inside of the vehicle.

With the above and other objects in view, the invention consists in a lock mechanism embodying certain novel and improved features hereinafter described and particularly pointed out in the claims the advantages of which will be readily understood by those skilled in the art.

The invention will be clearly understood from the accompanying drawing illustrating a preferred form of the invention and the following detailed description of the construction therein shown.

In the drawing, Fig. 1 is a view partly in elevation, partly in section and partly in diagram illustrating the lock mechanism for one of the doors and the circuit connections therefor, and Fig. 2 is a detail sectional view taken substantially on the line 2—2 of Fig. 1.

In the present form of the invention, each of the doors of a motor vehicle is provided with a conventional sliding latch bolt and conventional mechanism for advancing and retracting the bolt. The drawing shows the lock mechanism for one of the doors. In the construction shown, the lock mechanism is mounted in a housing 2 secured within the body of a door 4. The lock mechanism comprises a latch or lock bolt 6 mounted to slide longitudinally in suitable guides 8 secured to the housing and the left-hand end of the bolt is arranged to engage in a recess 10 in the door casing or frame 12 or in a striker plate attached to said frame. The bolt 6 is advanced into engagement with the recess 10 by means of a spiral spring 14 secured to the lock casing and engaging the bolt. The bolt is retracted against the action of the spring by means of a shaft 16 rotatably mounted in a bearing carried by the door and having a handle 18 secured to the end thereof projecting on the outer side of the door. Attached to the shaft 16 within the lock casing 2 is a lever 20 having a projection 22 arranged to engage a projection 24 on the bolt to retract the bolt.

The bolt 6 is retracted from the inside of the vehicle by means of a remote control handle 26 located on the inside of the door. This handle is fixed to a shaft rotatably mounted in a bearing carried by the door and having an arm 28 secured thereto in which is secured a pin 30 engaging in a slot 32 in a link 34 pivotally connected to the right hand end, Fig. 1, of the bolt 6. When the door is unlocked the bolt 6 may be retracted by the application of a relatively light force either to the handle 18 or to the handle 26.

As far as described, the construction is conventional.

The mechanism for locking the door comprises means for preventing the turning of the lever 20 in a direction to retract the bolt 6. In the construction shown, this means comprises a lever 36 pivoted at 38 within the lock casing 2 and having at one end thereof a projection 40 arranged to engage a projection 42 on the lever 20. The lever 36 is normally held in position so that the projection 40 is out of the path traversed by the projection 42 during the rotation of the shaft 16, allowing the lever 20 and said shaft to be turned freely. In locking the door, the lever 36 is swung about the pivot 38 substantially into the position shown in Fig. 1. When the lever 36 is in this position, the projection 40 is located in position to be engaged by the projection 42 to prevent the lever 20 from being turned in a direction to retract the bolt 6.

The mechanism for controlling the position of the lever 36 comprises a lever 44 pivoted at 46 within the lock casing 2 and connected by means of a link 48 with the lever 36. The lever 44 is located between a set of electromagnets 50 and a set of similar magnets 52 and constitutes an armature for said magnets. When the magnets 52 are energized, the lever 44 is swung downwardly and the lever 36 is actuated to carry the projection 40 out of the path of the projection 42 so that the lever 20 and the shaft 16 may be actuated to retract the bolt 6. When the magnets 50 are energized, the lever 44 is swung upwardly to carry the lever 36 into locking position as shown in the drawing.

The flow of current respectively through the magnets 50 and 52 is controlled by a switch preferably located within the vehicle in a position such that it may be readily reached and operated by the driver of the vehicle. In the construction shown, the circuit connections for the magnets 50 comprise a conductor 54 connecting the coils of one of said magnets with a contact member 56 mounted in a slot 58 in the knob or ball 60 secured to the top of the hollow gear shift lever or rod 62. The switch contact 56 is arranged to be engaged by a contact or switch lever 64 pivoted at 66 in the slot 58, said lever, when swung into the position shown in Fig. 1, engaging said contact. The switch lever 64 is constantly engaged by a contact pin 68 mounted to slide in a guide in a block 70, and held by a coiled spring 72 yieldingly in engagement with the contact face 74 on the lever. The block 70 is connected by a conductor 76 with one terminal of a battery 78, the other terminal of which is connected by a conductor 80 with a ground 82. The coils of the other magnet 50 are connected by a conductor 84 with a ground 86.

The circuit connections for the magnets 52 comprise a conductor 88 connecting the coils of one of said magnets with a contact member 90 secured in the slot 58 and arranged to be engaged by the contact lever 64, the lever being engaged with said contact by swinging the lever in a counterclockwise direction from the portion shown in Fig. 1. The coils of the other magnet 52 are connected by a conductor 91 with the ground 86.

With the above construction, when the switch lever 64 is swung into the position shown in Fig. 1 to engage the contact member 56, the magnets 50 are energized and the lever 44 is swung upwardly to throw the lever 36 into locking position. When the lever 64 is swung into engagement with the contact member 90, the magnets 52 are energized to throw the lever 36 into unlocking position. In order to hold the lever 36 in either of said positions, a detent spring plate 92 is fixed at one end to the casing 2 and is provided with rounded depressions 94 arranged to receive the adjacent rounded edge of the lever 44. These depressions 94 and the spring plate 92 are located to hold the lever 44 respectively in locked and in unlocked positions.

It will be noted that the locking mechanism thus far described does not prevent the retraction of the bolt 6 from within the vehicle by the actuation of the remote control handle 26.

Means is provided for controlling the movements of the bolt 6 so that it can be retracted from the inside of the vehicle only by the application of a heavy force. This means comprises a slide 96 mounted for longitudinal movement between one of the guides 8 and a block 98 secured within the lock casing 2. Pivoted at 100 to the left hand end, Fig. 1, of the slide 96 is a lever 102 having a projection 104 arranged to engage in a recess 106 in the bolt 6. When the door is unlocked, the lever 102 is held in lowered position as shown in dot-and-dash lines in Fig. 1 so that the bolt 6 will not engage the projection 104 during the retracting movement and may be freely retracted by the operation of either of the bolt retracting mechanisms. When the door is locked, the lever 102 is swung upwardly into the position shown in full lines in Fig. 1, thereby engaging the projection 104 on the lever in the recess 106 in the bolt. With the lever in this position, when the bolt is retracted, it will engage the projection 104 on the lever and move the lever therewith. The lever 102 is swung from unlocking to locking positions and from locking to unlocking position in accordance with the corresponding movements of the lever 36 by means of a pin 108 secured in the link 48 and engaging in a slot 110 in said lever.

The slide 96 is acted upon by a mechanism which prevents the retracting movement of the bolt 6 when the parts are in locked position except by the application of a heavy force. This mechanism comprises a ball 112 mounted in a bore 114 in the block 98 and arranged to engage in a V-shaped recess 116 in said slide. The ball is acted upon by a comparatively heavy coiled spring 118, mounted in the bore 114, the pressure of which on the ball may be adjusted by means of an adjusting screw 120 threaded into the outer end of said bore.

With the above construction when the lever 102 is in locked position, the bolt 6 cannot be retracted readily by the actuation of the handle 26. As the said handle is grasped by an occupant of the vehicle and force is applied thereto in a direction to retract the bolt 6, the retracting movement of the bolt is resisted by the yielding pressure exerted by the ball 112 within the recess 116. In order to retract the bolt this ball must be forced from the recess during the retracting movement of the bolt and of the slide 96 therewith. This requires a relatively heavy force which may be regulated by the adjustment of the screw 120.

The screw 120 is preferably adjusted so that the door can be opened by an adult person but so that a small child will not have sufficient strength to overcome the pressure of the spring 118 and force the ball from the recess 116.

In order to prevent the slide 96 and the lever 102 from being left in retracted positions in the event that the switch lever 64 is moved to unlocked position while these parts are retracted, the bolt is provided with a projection 122 arranged to engage the projection 104 on the lever 102 when said lever is in lowered position. Assuming that the bolt 6, the slide 96 and the lever 102 have been retracted while the parts are in locked condition by the actuation of the remote control handle 26, upon the release of the bolt 6 by the said control handle, the spring 14 will advance the bolt and the lever 102 and the slide 96 will be advanced therewith into the position shown in the drawing through the engagement of the projection 122 on the bolt with the projection 104 on the lever.

In the present application, the locking mechanism for only one of the doors of the vehicle is shown.

In a construction in which each of the doors is provided with a locking mechanism substantially the same as that shown in Fig. 1 of the drawing, all of the doors may be locked from the inside by the actuation of the switch lever 64 and intrusion will then be effectively prevented.

The force of the spring 118 exerted on the ball 112 may be adjusted to any desired degree by the adjustment of the screw 120. This adjustment may be such that any desired force is required to retract the latch bolt of any door and release the door.

With the present construction the doors may be effectively locked by the actuation of the switch lever 64 so as to prevent them from being opened by children. The screw 120 of each lock is preferably adjusted so that children will not have sufficient strength to retract the bolt 6, when the locking mechanism is in locked condition. This is especially advantageous when children are placed in the rear compartment of a vehicle having a forward or driving compartment and a rear compartment for passengers since it enables the children to be locked in the rear compartment. The switch lever 64 in this case is preferably located where it is accessible to the driver or by some other person riding in the front compartment but cannot be reached from the rear compartment.

With the above construction, if a person within a vehicle tries to open one of the doors by the operation of the inside remote control handle 26, he meets with the heavy resistance to the retracting movement of the bolt produced by the engagement of the ball 112 in the recess 116. This resistance will prevent the careless, inadvertent or accidental opening of the door and also will ordinarily prevent the opening of the door for the purpose of slamming it. The person attempting to open the door will probably think that the door is locked. If he inquires he may be informed that the door is locked because of the danger of opening the same, but that it may be opened in an emergency against the locking mechanism if sufficient force is applied to the handle 26. This will serve to relieve any uncomfortable feeling he may have that he is locked in the vehicle so that he cannot escape from the same.

The mechanism for preventing the retraction of the bolt 6 when the door is locked except by the exercise of a heavy force on the handle 26 thus constitutes an effective safety device and avoids many of the disadvantages of prior door locking mechanism.

The term "heavy force" applied in the specification and claims to the force required to retract the bolt 6 when in locked condition is a relative term and refers to a force considerably greater than that required to produce the ordinary retracting movements of the bolt to release the door when the locking mechanism is out of operation. This "heavy force" required to produce the retracting movement of the bolt when the locking mechanism is in operation may be regulated as desired by the adjustment of the screw 120.

It is to be understood that the invention is not limited to the particular construction and arrangement of parts of the illustrated embodiment of the invention, but that the construction shown and described is merely illustrative of the invention and that the invention may be embodied in other forms within the scope of the claims.

Having explained the nature and object of the invention and having specifically described the construction embodying the invention in its preferred form, what is claimed is:

1. A door securing means for motor vehicles comprising a spring pressed bolt, means operable from outside the vehicle for retracting the bolt, means operable from inside the vehicle for retracting the bolt, a locking device movable to render the outside retracting means inoperable and to substantially increase the resistance of the bolt to movement by the inside retracting means.

2. A door securing means for motor vehicles comprising a spring pressed bolt, means operable from outside the vehicle for retracting the bolt, means operable from inside the vehicle for retracting the bolt, a locking device movable to render the outside retracting means inoperable and to appreciably increase the resistance of the bolt to movement by the inside retracting means, said locking device being so constructed that it retains its locked position as the bolt is retracted by the inside retracting means.

3. A door securing means for motor vehicles comprising a spring pressed bolt, means operable from outside the vehicle for retracting the bolt, means operable from inside the vehicle for retracting the bolt, a locking device movable to render the outside retracting means inoperable and to increase the resistance of the bolt to movement of the inside retracting means, said resistance being independent of any movement of the locking device itself.

4. In a door securing means, the combination with a dually controlled bolt, means for securing said bolt in locked position against actuation by one of the controls, and means for maintaining said bolt in locked position against actuation by the other control except when a heavy force is exerted thereagainst.

5. In a door securing means, the combination with a dually controlled bolt, means for securing said bolt in locked position against actuation by one of the controls, releasable means for maintaining said bolt against actuation by the other control except when a heavy force is exerted thereagainst, and means for throwing said locking and releasable means into and out of operation simultaneously.

6. Securing means for a motor vehicle door comprising an inside door handle, an outside door handle, bolt means for retaining the door in a closed position, means operatively engaging said bolt means with said handles, means for locking the outside handle against use, and means obstructing actuation of said bolt means until a predetermined extra amount of force is exerted thereupon.

7. Securing means for a motor vehicle door comprising an inside door handle, an outside door handle, lightly impelled bolt means for retaining the door in a closed position, means operatively engaging said bolt means with said handles, means for locking the outside handle against use, and means engaging said bolt means to obstruct its retraction until a relatively heavy force is exerted thereagainst.

8. Securing means for a motor vehicle door comprising an inside door handle, an outside door handle, bolt means for retaining the door in a closed position, means operatively engaging said bolt means with said handles independently, means for locking the outside handle against use, and a second locking means for obstructing actuation of said bolt means independent of said lock means until a predetermined extra amount of force is exerted upon the inside handle.

9. Securing means for a motor vehicle door comprising an inside door handle, an outside door handle, a bolt means for retaining the door in a closed position, means operatively engaging said bolt means with said handles independently, means for locking the outside handle against use, and a second locking means movable independent of said first locking means for releasing said bolt means when a predetermined extra amount of force is exerted thereupon.

10. Securing means for a motor vehicle door comprising an inside door handle, an outside door handle, a bolt means for retaining the door in a closed position, means operatively engaging said bolt means with said handles independently, means for locking the outside handle against use, a second locking means for obstructing movement of said bolt means independent of said lock means until a predetermined extra amount of force is exerted thereupon, and means simultaneously controlling said first and second locking means.

11. Securing means for a motor vehicle door comprising means for operating the door from the inside or from the outside, bolt means for retaining the door in a closed position, means for locking said outside operating means against use, a semi-locking means for obstructing movement of the bolt means by said inside operating means except under extra exertion of force against said inside means, and means simultaneously controlling said locking and semi-locking means.

12. Securing means for a motor vehicle door comprising an inside door handle, an outside door handle, bolt means for retaining the door in a closed position, means operatively engaging said bolt means to the respective handles independently, means rendering said outside handle inoperative to actuate said bolt means, and locking means for engaging said bolt means in a manner releasing the same only by a force exerted thereon greater than normally used in actuating the bolt means when unlocked.

MILTON TIBBETTS.